INVENTOR.
MARVIN MILLER

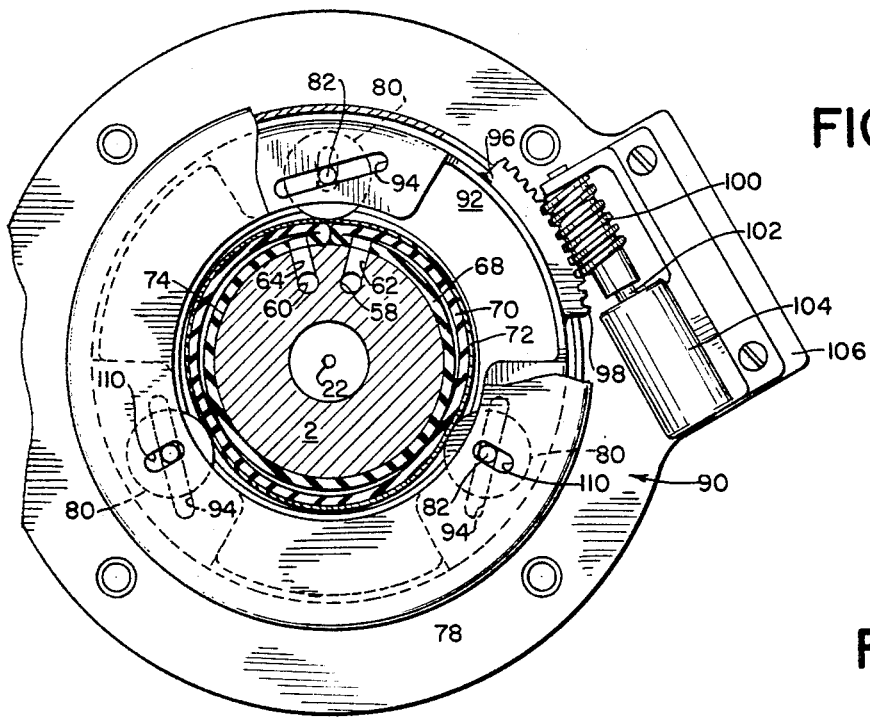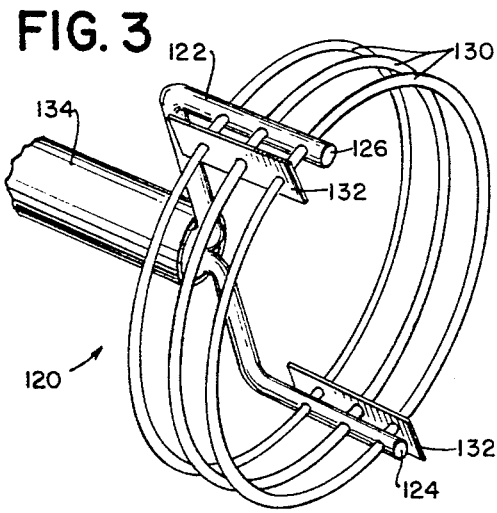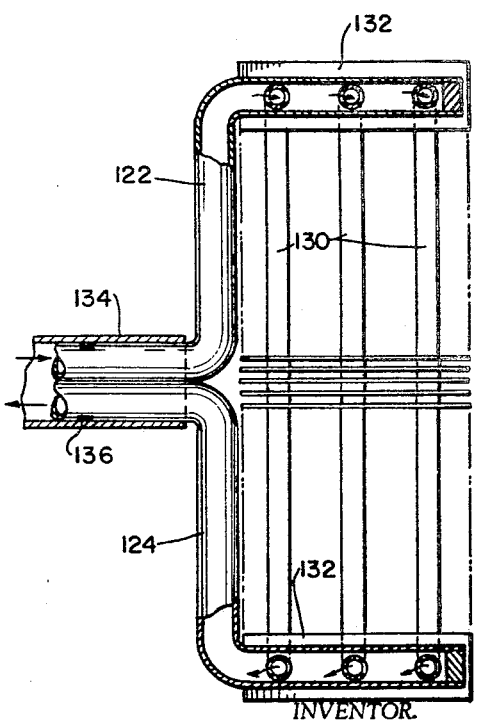

Aug. 20, 1968          M. MILLER          3,397,739
HEAT EXCHANGE APPARATUS
Filed May 12, 1965                6 Sheets-Sheet 3

INVENTOR.
MARVIN MILLER
BY
ATTORNEYS

Aug. 20, 1968  M. MILLER  3,397,739

HEAT EXCHANGE APPARATUS

Filed May 12, 1965  6 Sheets-Sheet 5

INVENTOR.
MARVIN MILLER

BY
Pennie, Edmonds, Morton, Taylor & Adams
ATTORNEYS 3,397,739
HEAT EXCHANGE APPARATUS
Marvin Miller, Fair Lawn, N.J., assignor to Sibany Manufacturing Corporation, Fair Lawn, N.J., a corporation of New Jersey
Continuation-in-part of application Ser. No. 368,153, May 18, 1964. This application May 12, 1965, Ser. No. 455,249
22 Claims. (Cl. 165—86)

ABSTRACT OF THE DISCLOSURE

A heat exchange apparatus having a rotatable shaft, heat exchangers mounted on either end of the shaft for rotation therewith, a compressor conduit mounted about the shaft, fluid conduits extending through the shaft and connecting the heat exchangers and compressor conduit together in series and pressure means for pumping fluid through the conduits and heat exchangers upon rotation of the shaft.

---

The present application is a continuation-in-part of applicant's copending application, Ser. No. 368,153, filed May 18, 1964 for Heat Exchange Apparatus, now abandoned.

Typical heat exchanger apparatus includes the elements of a compressor, condenser, liquid receiver, orifice expansion valve or capillary tube, and an evaporator. Both the condenser and the evaporator function as heat exchangers, the condenser being the element which dissipates heat and the evaporator that which absorbs heat. In the conventional operating cycle, the heat exchange fluid (e.g. Freon) is pumped under pressure into the condenser where the heat of condensation is given up as the fluid is liquified. Thereafter, the liquid is collected and pumped through an orifice or valve and allowed to expand in an evaporator. With the reduction of pressure, the liquid changes to the gaseous phase, becomes cool, and thus absorbs heat.

In the art, devices which use the same equipment to both heat and cool a space are commonly known as heat pumps. Heat pumps are characterized by the interchangeable use of the condenser as an evaporator and vice versa.

Conventional heat pumps normally utilize fixed heat exchangers, with complicated valve systems and are generally of heavy and bulky construction. Because the heat exchangers are fixed, it is common practice to utilize fans for circulating air past the exchangers. This is because it is advantageous to have the fluids upon both sides of the heat conductive barrier in motion. By moving the fluids (e.g., the heat exchange fluid and air) relative to each other, temperature differentials between the fluids tend to be maintained thus increasing the efficiency of the heat transfer. Were the fluids allowed to remain stagnant, the temperature differential between the fluids would very quickly drop and attain equilibrium thus ending the transfer of heat.

The present invention dispenses with the limitations of prior art heat pumps and air conditioners by providing a compact efficient heat exchange apparatus. The apparatus requires no additional mechanisms such as separate fans, motors or the like, to circulate the air, yet the fluids involved are maintained in continuous motion. The principal moving parts are driven in the same rotary direction as the drive motor and there are no reciprocating motions as are found, for example, in a conventional compressor. Thus, efficiency is increased.

In accordance with the present invention, heat exchange apparatus is provided which may be used for both heating and cooling purposes such as an air conditioning unit which can both heat and cool a room. In the preferred embodiment of the invention, separate heat exchangers are mounted upon opposite ends of a rotatable shaft each of which may be used either as a heater or a cooler depending only upon the direction of rotation of the shaft.

In accordance with a featured aspect of the invention, improved operating efficiency is effected by providing rotary heat exchangers which perform the dual function of propelling the temperature conditioned air and of transferring heat between the propelled air and the moving fluid within. The improved heat exchangers in a broad sense are ducted fans which have a plurality of heat exchange tubes forming the fan portion of the apparatus.

A further feature of the present invention resides in the compressor provided for compressing the expansible fluid which acts as the heat exchange fluid. The compressor is of simple construction and few parts.

The compressor of the present invention comprises pressure contact means in the form of a single eccentric ring or a plurality of rollers in pressure contact with a flexible duct. Upon the relative movement of the eccentric ring or rollers with respect to the flexible duct, fluid trapped in the duct is forced to move in a given direction. In the preferred embodiment, the flexible duct is mounted upon the rotatable shaft, the eccentric ring or rollers being held in pressure contact with the flexible duct by a stationary support. As the shaft is rotated the fluid within the duct is moved.

The amount of pressure upon the duct and thus the size of the internal opening of the duct may be changed by varying the eccentricity of the ring with respect to the shaft or by varying the distance between the roller and the shaft. With the roller construction, this is preferably done by means of a variable position cam. The variation in roller position will vary the degree of fluid compression and thus, in the air conditioner, the degree of heating of the expansible fluid.

In accordance with the foregoing, the invention is, broadly, for an air conditioning apparatus which utilizes an expansible heat exchange fluid. The mechanism comprises a rotatable shaft having a main conduit therein and constriction defining an orifice within the conduit. Suitable means are provided for rotating the shaft and supporting it during rotation. Heat exchangers are mounted upon each end of the rotatable shaft and each heat exchanger has heat exchange tubes in communication at their one end with the interior of the main conduit and in communication at their other end with a flexible conduit mounted upon the shaft. Pressure contact means in pressure contact with the flexible conduit are provided, which means force the heat transfer fluid through the flexible conduit upon the rotation of the rotatable shaft. In the preferred embodiment the apparatus is thermodynamically reversible; the shaft being mounted for rotation in either a clockwise or counterclockwise direction.

The heat exchanger apparatus made in accordance with the invention is compact, lightweight and low in cost.

The foregoing and other objects, features and advantages of the invention will be apparent from the following more particular description of the preferred embodiments of the invention, as illustrated in the accompanying drawings.

FIG. 2 is a cross-section taken through line 2—2 of FIG. 1;

FIG. 3 is an isometric detail of another embodiment of the invention illustrating a centrifugal heat exchange fan;

FIG. 4 is an elevation of the heat exchange fan of FIG. 3;

Figure 1:
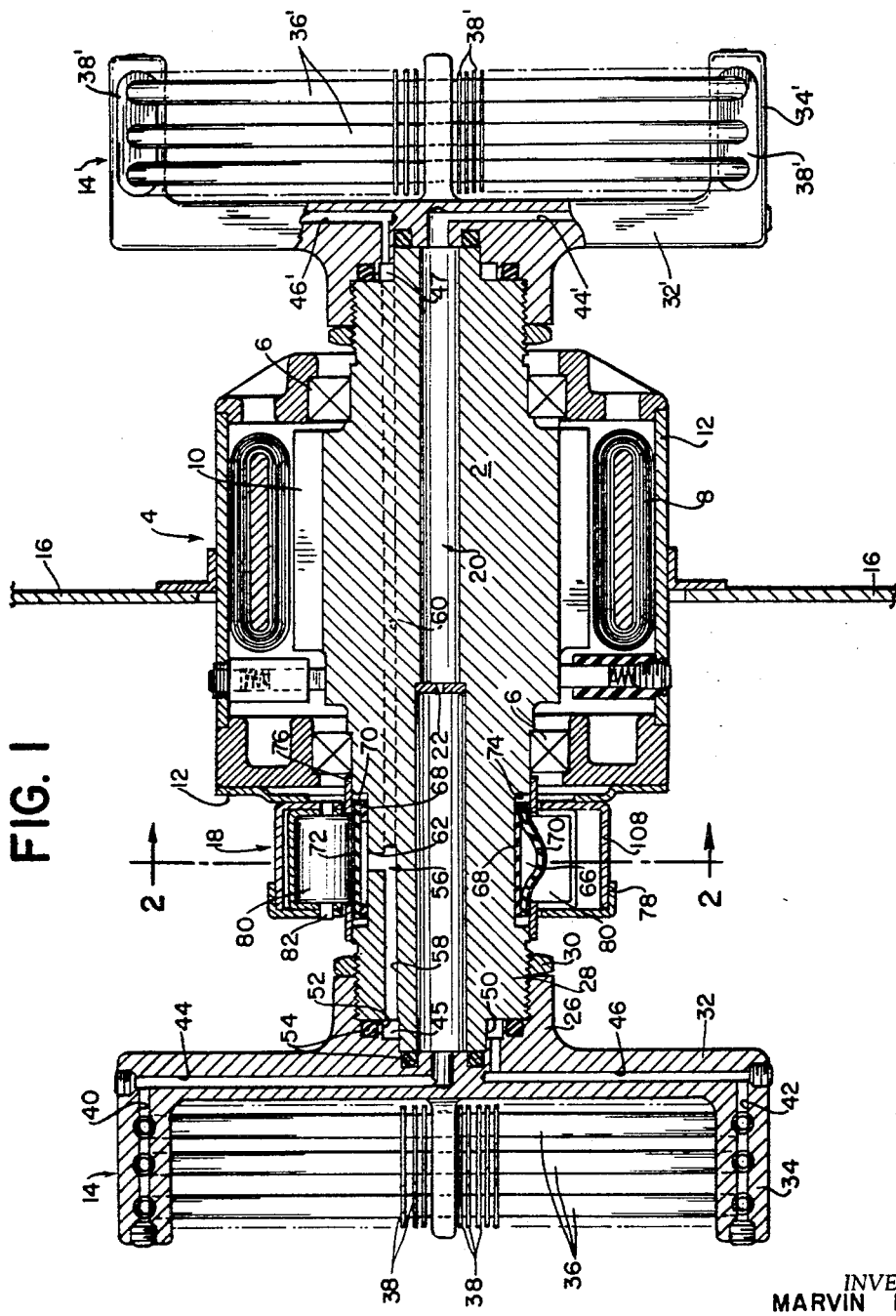
FIG. 1 is a partial elevation section of the rotatable heat exchange apparatus provided by the present invention.

Referring to FIG. 1 the heat exchange apparatus has as its central part a rotatable shaft 2 which, in the embodiment shown, is the rotor in a motor, generally denoted as 4. The rotatable shaft 2 is driven as a part of the motor 4 but could also be driven by an externally mounted motor. The motor 4 is electrically reversible and capable of driving the rotatable shaft 2 in either direction. The motor 4 is also preferably a variable speed motor which permits variation in the rate of compression of the heat exchange fluid and thus of the heat exchange capacity of the apparatus. Bearings 6 are provided for supporting the rotatable shaft 2 during rotation and, as here shown, field windings 8 which in conjunction with armature windings 10 act to drive the rotatable shaft 2. The motor assembly is mounted within a suitable housing 12. The entire heat exchange apparatus in turn is positioned within a cabinet (see FIG. 9) equipped with means to permit air circulation about each of the heat exchange fans 14 and 14', which, for purposes of simplicity, are shown as being identical. Within the cabinet is a baffle plate 16 which separates the air heated by the heat exchange fan 14 at one side of the baffle plate 16 from the air cooled by the heat exchange fan at the other side.

A compressor generally denoted as 18, the operation of which will be later described in detail, is positioned adjacent the motor 4 and substantially surrounds the rotatable shaft 2.

Rotatable shaft 2 has a main conduit 20 running longitudinally through its length. The main conduit 20 has a constricted portion 22 defining an orifice therein. Other conduits in the shaft 2 will be described later.

The heat exchanger fans 14 and 14' are mounted upon opposite ends of the rotatable shaft 2. Only heat exchanger 14 will be described here in detail. However, it is understood that heat exchanger 14' can be the same and thus reference numerals to elements of both exchangers will be differentiated only by the use of the designation for prime, thus ('). Each heat exchanger is secured at its hub 26 upon the threaded portion 28 of the rotatable shaft 2 and held there by lock nut 30. The heat exchanger fan 14 is provided with a pair of hollow spokes 32 having right angle portions 34. The hollow spokes 32 serve to support a plurality of heat exchange tubes 36, such tubes being substantially ring-shaped and preferably provided with radiating fins 38, which are preferably curved to improve fan efficiency. Other spokes may of course be added to give more rigidity to the heat exchanger fan 14 but only the hollow spokes 32 will be discussed here.

The interiors of the heat exchange tubes 36 are in communication with the interiors of the hollow spokes 32 by connection at the right angle portions 34. While it is understood that the hollow interior of the spokes 32 is substantially continuous those portions within the right angle portions 34 will be referred to as headers and will be more specifically referred to as primary header 40 and secondary header 42. Similarly, those portions of the hollow spoke interior within the radial portion of the spoke 32 will be referred to as the primary duct 44 and secondary duct 46.

Primary header 40 is in communication with main channel 20 via a primary duct 44 in spoke 32. Secondary header 42 is in communication with annular space 45 via secondary duct 46 in spoke 32. Annular space 45 is defined by the narrow end portion 50 of the rotatable shaft 2 in cooperation with an interior cup portion 52 of the hub 26. Suitable O-rings 54 seal the annular space 45.

The rotatable shaft 2 is further provided with an interrupted secondary conduit 56 comprising a first bore 58 and a second bore 60. Bore 58 is preferably parallel to the longitudinal axis of the rotatable shaft 2 and communicates with the annular space 45 at one end of the shaft. Bore 60 is also preferably parallel to the longitudinal axis of rotatable shaft 2 and communicates with the annular space 47 at the other end of the shaft. Each bore 58 and 60 exists at a point intermediate the ends of the shaft 2 to the exterior of rotatable shaft 2 via tap holes 62 and 64 respectively (see FIG. 2).

Referring to FIG. 1 and also to FIG. 2 where a section of flexible duct 66 is illustrated, it can be seen how flexible duct 66 substantially surrounds rotatable shaft 2. It can further be seen how the first bore 58 and the second bore 60 communicate with each other via flexible duct 66. Flexible duct 66 communicates at its one end to first bore 58 via tap hole 62 and with second bore 60 via tap hole 64. It is thus apparent from the foregoing description that first bore 58 and second bore 60 together comprise the secondary conduit 56 which has as an intermediate linking portion flexible duct 66. It is further evident that all channels, ducts, headers, spaces and bores form a complete closed circuit for fluid flow.

Referring especially to FIG. 2, flexible duct 66 has two flexible walls 68 and 70 made of a flexible material, such as rubber, neoprene, Teflon or the like. The two flexible walls 68 and 70 are sandwiched between the shaft 2 and a flexible protective cover 72. The flexible walls 68 and 70 are sealed at their outer longitudinal edges by heating for example and the flexible walls and the protective cover 72 are set in a groove 74 in the shaft 2. The edges of the walls 68 and 70 and the cover 72 are all held in the groove 74 by annular rings 76.

Figure 10:
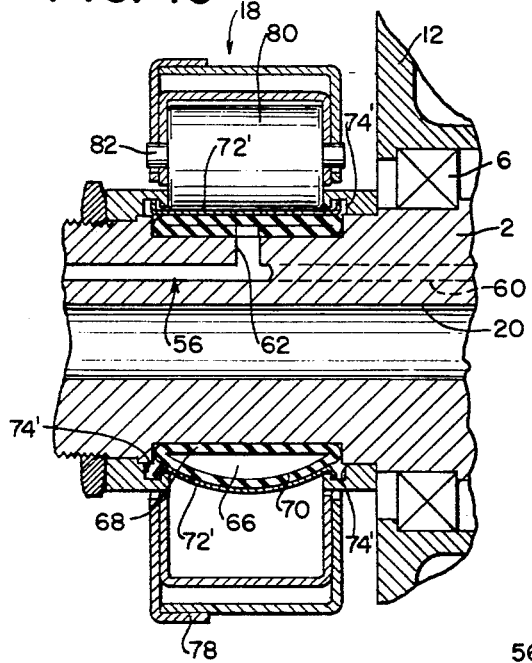
FIG. 10 is a partial section of a modified embodiment of the rotatable heat exchange apparatus of the present invention.
Figure 11:
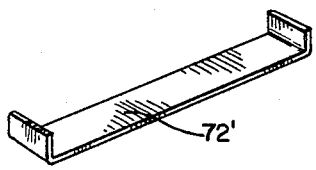
FIG. 11 is a perspective view of one of the spring elements employed in the construction shown in FIG. 10.

Instead of employing a unitary flexible cover 72 as shown in FIG. 1, a plurality of flexible spring covers 72' may be used. Such a construction is shown in FIGS. 10 and 11. To permit the spring covers to flatten out as the rollers 80 compress the underlying flexible duct 66, the bent ends of the springs are received in a circumferential slot 74' which is elongated in a direction along the longitudinal axis of the shaft 2. By using a plurality of separate spring covers 72' as opposed to the unitary cover 72; unnecessary flexing of cover in a direction circumferentially of the shaft 2 is avoided. The separate springs having limited area in this direction need merely flex in the one direction along their length as they come under the rollers 80.

It is noted at this point that the flexible duct 66 as described is but one way in which the duct may be fashioned. In another embodiment (not illustrated) the flexible duct comprises a flexible tube defining a helix of one or more turns about the exterior of the shaft 2. The effective pumping portion of the flexible duct 66 is thus disposed in an annular ring about the rotatable shaft 2.

Compressor 18, having a casing 78, is disposed about the flexible duct 66. For descriptive purposes the compressor 18 will be treated as separate from the flexible duct 66 but the duct is in fact a part of the compressor combination as well as of the fluid circuit of the heat exchange apparatus. Compressor 18 is provided with a plurality of rollers 80 arranged concentrically with respect to shaft 2, which by reason of their spacing from the rotatable shaft 2 are in pressure contact with the flexible duct 66, and effectively collapse or squeeze the flexible walls 68 and 70 into fluid tight contact with each other under the rollers. The rollers 80, while rotatable about their axles 82, are stationary with respect to the rotatable shaft 2. Thus, when rotatable shaft 2 is rotated, fluid trapped between the rollers 80 is forced to move through the flexible duct 66. The fluid is forced to flow either from bore 58 to bore 60 or vice versa depending upon the direction of rotation of rotatable shaft 2. Pressure will be exerted upon the fluid on the downstrem side of the pump 18 by reason of the back pressure built up at the constricted portion 22 of the main channel 20.

Referring to FIG. 2, the compressor regulator 90 comprises a cam plate 92 provided with cam slots 94 in which the axles 82 of the rollers 80 are movably positioned. Each cam slot 94 is orientated with its longitudinal axis on a diagonal with an intersecting radius. The cam plate 92 is rotatable through a limited arc by a rack 96 appended to the rim of the cam plate 92. The teeth 98 of the rack 96 engage the threads of a worm gear pinion 100. The shaft 102 of the worm gear pinion 100 is mounted for rotation in an adjustment motor 104. The pinion shaft 102 and the adjustment motor 104 are supported by a bracket 106 secured to the motor housing 12. Covering the end of the compressor 18 is the compressor casing 78, which is stationary and provided with radial slots 110 into which the roller axles 82 also extend. The radial slots 110 are each orientated to permit radial movement of the rollers 80. The cam slots 94 and the overlying radial slots 110 cooperate to permit selective radial movement of the rollers 80 to a degree dependent upon the amount of rotation of cam plate 92. As cam plate 92 is rotated, axles 82 are caused to slide radially inwardly or outwardly depending upon the direction of rotation of the cam plate.

From the foregoing, it can be seen that the rotation of worm pinion 100 will cause the rack 98 and thus the cam plate 92 to move in a rotary fashion. As a result of the movement of cam plate 92, and depending upon the direction of its movement, the rollers 80 will move inwardly or outwardly with respect to the shaft 2 and thus with respect to the duct 66. The movement of the rollers 80 relative to the flexible duct 66 will change the size of the passage within the duct 66. Thus, by means of regulation of the position of the rollers 80, varying amounts of fluid will pass through the duct 66 and the degree of fluid pressure in the apparatus will vary.

Figure 9:
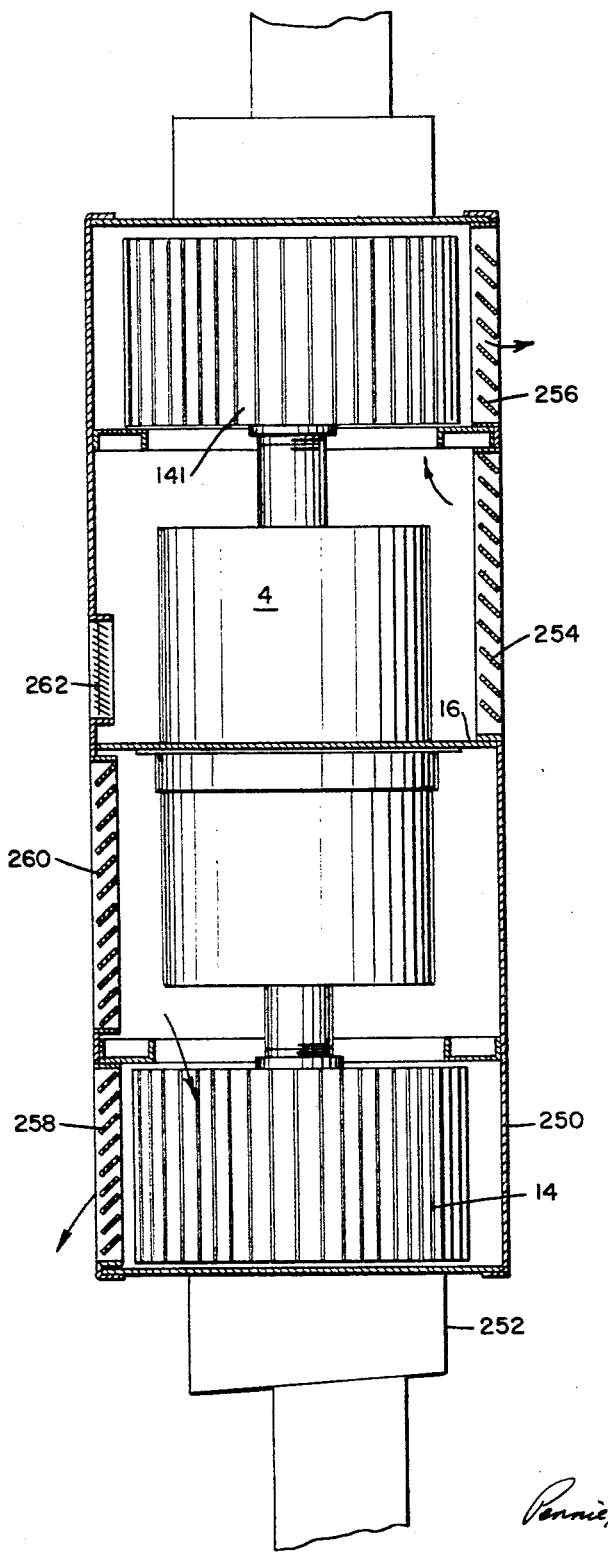
FIG. 9 is a plan view of a window air conditioner cabinet incorporating the novel heat exchange apparatus.

FIG. 9 schematically illustrates the heat exchanger apparatus of FIG. 1 as it might be used in a window air conditioner installation. There a cabinet 250 is shown substantially enclosing the heat exchanger apparatus 2 with its heat exchangers 14 and 14' mounted at either end. The cabinet 250 is shown with its longitudinal dimension extending across the window frame 252. This orientation is decidedly more compact than the typical window air conditioner which is often seen jutting obtrusively from a window. The cabinet 250 is provided with interior louvers 254 and 256. Exterior louvers 258 and 260 are located along the outside of the cabinet. The baffle plate 16 separates the two heat exchange units 14 and 14' and the interior and exterior louvers from each other. A fresh air inlet 262 is provided in the exterior of the cabinet and is located along the same side of the baffle plate 16 as the interior louvers. From the foregoing, it can be seen that when the air conditioner is in operation with the heat exchangers acting as fans to circulate the air, outside air will be drawn into the cabinet 250 at one side of baffle plate 16 through exterior louvers 260, passed through the heat exchanger fan 14, and returned to the outside through louver 258. At the same time, air within the room will be drawn into the cabinet 250 at the other side of baffle plate 16 through louvers 254, passed through heat exchanger 14' at that end and returned to the room through louver 256. Should additional fresh air be desired, fresh air inlet 262 may be opened and a quantity of exterior air will be mingled with the interior air flowing through the unit. Since the air conditioner is thermodynamically reversible, the air in the room may be heated or cooled simply by changing the direction of rotation of the main shaft. Depending upon the direction of rotation of the main shaft, the heat exchanger 16 will act as either a heater or cooler. Also heat exchange with the exterior air will always take place with heat exchanger 14.

The heat exchanger apparatus functions in the following manner. Assume that there is a heat exchange fluid such as Freon within the ducts and tubes of the apparatus of FIG. 1, as would be the case in actual use, and assume further, for the purpose of this description, that the shaft 2 is rotated clockwise (as viewed along section 2—2). Thus, shaft rotation would be in the clockwise direction as seen in FIG. 2.

Operation of the apparatus begins with the starting of the motor 4 which causes the shaft 2 to rotate clockwise. All portions of the shank 2 including the heat exchanger 14 and the flexible duct 66 will, of course, also rotate clockwise with the shaft 2.

Tracing the flow of the heat exchanger fluid, Freon in this case, from the compressor 18 through its circuit, it is seen that the Freon in the flexible duct 66 is trapped between the rollers 80; and as the shaft 2 rotates clockwise, this Freon is forced to move through the duct 66, through tap hole 62 and into first bore 58. From first bore 58, the Freon flows into annular space 45 and thus into the secondary duct 46 and secondary header 42. From the secondary header 42, the Freon flows into the heat exchange tubes 36 and then into primary header 40. Next, the Freon flows to primary duct 44 and into main conduit 20. In main conduit 20, the flow of Freon is restricted because of the constriction 22. As the shaft 2 continues to rotate rapidly, substantial pressure is built up behind or on the upstream side of the constriction 22. The result is that the Freon is subjected to compression which causes it to become liquefied in the passages upstream of the constriction 22 and downstream of the compressor 18. As the Freon is compressed, its temperature rises above that of the surrounding air. Thus, heat is radiated through the heat exchange tubes 36 and the fins 38 to the surrounding air.

In this embodiment of the invention, the degree of compression of the Freon may be regulated by the compressor regulator 90. The regulator 90 controls the degree of opening within the flexible duct 66 by regulating the spacing of the rollers 80 and thus compression is varied. The regulator 90 may be operated by a number of means but preferably it is thermostatically controlled.

Following the passage of the Freon, it next passes, in liquid form now, through the orifice defined by the constriction 22. Upon doing so it enters an area of relatively low pressure and instantly expands into the gaseous phase throughout the main channel 20, into annular space 47, into primary duct 44' and so into the heat exchange tubes 36'. Upon decompression into the gaseous phase, the Freon becomes cooler than the surounding air and thus as the Freon passes through the heat exchange tubes 36' heat will be absorbed from the surrounding air which in turn is cooled. From the heat exchanger 14' the Freon returns to the compressor 18 via secondary duct 46' and second bore 60. The cycle then repeats.

In the foregoing example heat exchanger 14 was the condenser and heat exchanger 14' the evaporator. The function of each of these heat exchangers is reversed by reversing the rotation of the shaft 2. Thus, were shaft 2 to be rotated in a counterclockwise direction (as viewed in FIG. 2) the Freon would be forced through second duct 60 and into heat exchanger 14'. Since heat exchanger 14' is then on the upstream side of constriction 22 compression of Freon into the liquid phase would take place there. Evaporation would take place in heat exchanger 14. Suitable check valve means (not shown) are provided on the effective outlet side of the compressor for preventing backflow of the high pressure fluid into the compressor. The outlet side of the compressor will, of course, depend on the direction of rotation of the shaft 2, therefore by-pass conduits (not shown) will also be provided to permit flow of fluid around the check valve when the valve is on the inlet side of the compressor.

Because of the novel structure of the heat exchange apparatus of this invention, the function of the heat exchangers is changed easily and simply. In addition, efficiency is greatly increased. No energy loss occurs from extra loads such as fan motors and reciprocating compressors. The efficiency of the heat exchangers themselves is increased by reason of their own motion as well as by their function as centrifugal fans. The rotation of the heat exchangers 14 and 14' causes air to move from the approximate center of rotation of the fans radially past the heat exchanger tubes 36 and 36'. Should it be desired to use the apparatus as a fan only, this may be done by adjusting the pump regulator 90 so that no compression of the heat exchange fluid takes place.

In the foregoing discussion heat exchanger fans 14 are in the form of centrifugal fans. Referring to FIGS. 3 and 4, a different embodiment of the centrifugal heat exchanger fan is there shown. The heat exchanger fan, designated generally as 120 is of notably lighter construction and comprises angled headers designated for the purpose of these drawings as inlet header 122 and outlet header 124. The headers 122 and 124 are tubular and are closed at their outer ends 126 and 128 respectively. Heat exchange tubes 130 of substantially circular configuration have their interiors in communication with the headers 126 and 128. The heat exchange tubes 130 are provided with a plurality of radiating fins 132. Headers 122 and 124 extend into the main shaft 134 and are secured there by any suitable means such as brackets or weld spots 136.

Figure 5:
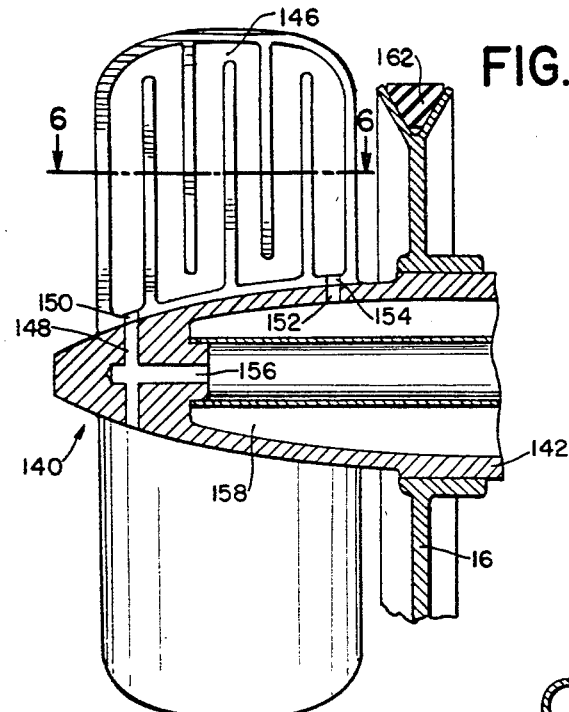
FIG. 5 is a section of another embodiment of the heat exchange fan having ducted fan blades.
Figure 6:
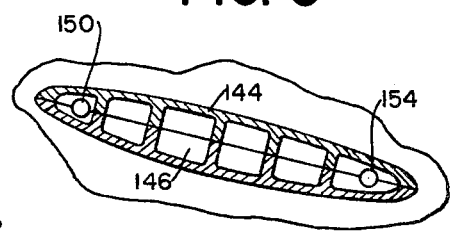
FIG. 6 is a section through 6—6 of FIG. 5.
Figure 7:
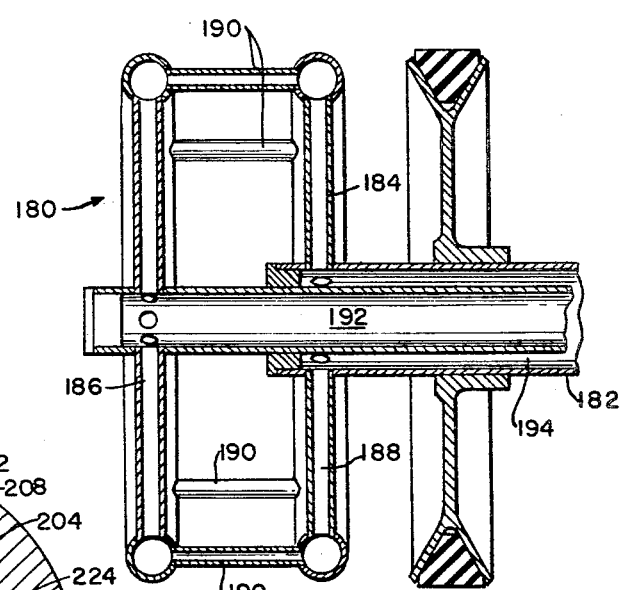
FIG. 7 is a section of another embodiment of a centrifugal heat exchange fan having a co-axial shaft.

The heat exchanger fan 120 of this embodiment is adaptable to use in heat exchange apparatus of FIG. 1. Thus shaft 134 would correspond to shaft 2. A continuation of inlet header 122 would correspond to primary conduit 20 and a continuation of outlet header 124 would correspond to secondary conduit 56. Other heat exchanger embodiments are shown in FIGS. 5, 6 and 7. The heat exchangers illustrated in these embodiments may likewise be incorporated into the air conditioning apparatus of FIG. 1 or may be adaptable to other heat exchange purposes.

Referring specifically to FIGS. 5 and 6, there is shown a heat exchanger 140 having a ducted shaft 142 and ducted blades 144. The ducted blades 144 are preferably of propeller-like configuration suitable for moving a body of air upon rotation of the shaft 142. Thus in this embodiment the heat exchanger fan might be used in a heat exchanger apparatus, or independently, as a typical rotating fan. Blade 144 is provided with a plurality of interconnecting heat exchange channels which form a continuous heat exchange duct 146 within the blade 144. The heat exchange duct 146 of the blade 144 is in communication with inlet 148 via opening 150. The heat exchange duct 146 is in communication at the downstream side with the outlet channel 152 via opening 154. Inlet 148 and outlet 152 are respectively in communication with the inlet duct 156 and outlet duct 158 of the shaft 142. The entire shaft 142 may be rotated as a portion of a motor as in FIG. 1 or by independent means such as a pulley 160 driven by a belt 162. Besides use upon the heat exchange apparatus of FIG. 1, the heat exchanger fan of this embodiment is particularly suitable for use in connection with water cooled engines such as automobile engines, where it would replace both the conventional fan and the conventional radiator.

FIG. 7 illustrates a variation upon the heat exchanger of FIGS. 5 and 6. It too may be used as part of the apparatus of FIG. 1 or independently. The heat exchanger 180 is an embodiment of the centrifugal fan type. The heat exchanger 180 comprises a ducted shaft 182 and a rotary heat exchange unit 184. The unit 184 comprises radial inlet headers 186 and return headers 188 in communication with each other via heat exchange tubes 190. The headers 186 and 188 also function as heat exchange tubes. The inlet header 186 is in communication with the inlet conduit 192 of the shaft 182, and the return header 188 is in communication with the outlet conduit 194. In the embodiment shown the main conduit 192 and the outlet conduit 194 are in co-axial relationship with each other. Also, as in the embodiment of FIG. 3, the heat exchange tubes 190 may be provided with fins (not shown).

Figure 8:
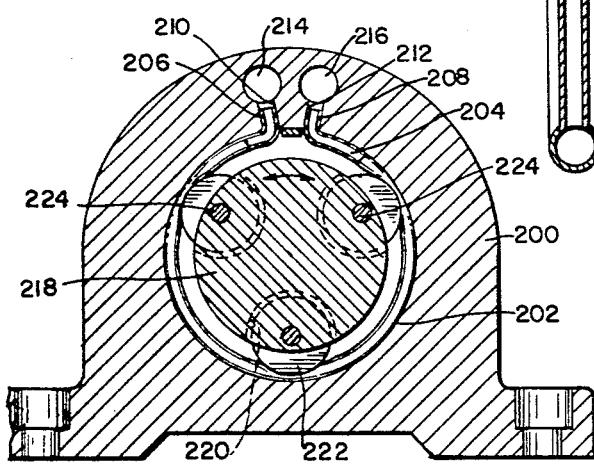
FIG. 8 is a section of another embodiment of the compressor shown in FIGS. 1 and 2 having internal rollers.

In FIG. 8 is seen a different embodiment of the pump or compressor described earlier with respect to FIGS. 1 and 2. The fundamental principle of the pumping action is the same as in the embodiment earlier described. In the earlier described embodiment the rollers were stationary and the flexible duct was rotated. In the embodiment of FIG. 8 the rollers are moved relative to the stationary flexible duct. A housing 200 has a substantially circular opening 202. The flexible duct 204 is disposed upon the wall of the opening 202 and has its ends 206 and 208 inserted in taps 210 and 212 respectively. The taps in turn are in communication with channels 214 and 216 which are in communication with a heat exchanger or other device to which a fluid is to be pumped. The flexible duct 204 has a cross-section like that of duct 66 shown in FIG. 1. Duct 204 comprises flexible walls 205, 207 sealed at their edges and a protective cover 209.

A rotatable shaft 218 is supported for rotation by suitable means (not shown). The axis of the shaft 218 is substantially that of the axis of opening 202. Shaft 218 is provided with a plurality of troughs 220. Situated substantially within troughs 220 are rollers 222. The rollers 222 are mounted for rotation upon pins 224. The shaft 218 and the dimension and positions of the rollers are such that the rollers 222 are in pressure contact with the flexible duct 204. Thus, when shaft 218 is rotated, fluid in the duct 218 is trapped between the rollers 222 and forced to move in a given direction depending upon the direction of the rotation of shaft 218.

In the embodiments of the present invention set out above, the compressor mechanism has been described as including a plurality of rollers acting as the pressure contact means for effecting a collapse of the flexible duct. Instead of employing rollers, it is within the scope of the present invention to use a single ring member positioned eccentrically with respect to the rotating shaft for effecting single point of collapse or constriction of the flexible duct and thus a single pressure stroke per revolution of the shaft. With such a construction, the cover 72 or 72' of the previously described embodiments is eliminated and the ring itself employed for supporting the duct throughout its length. The pressure ring, which itself is a rigid member, provides a construction which is simpler than one where a plurality of separate spring members are used and thus facilitates easier assembly of the device; and due to the rigid characteristics of the ring member, fatigue that might otherwise tend to occur with the flexible covers 72 or 72' due to their required flexing is avoided.

Figure 12:
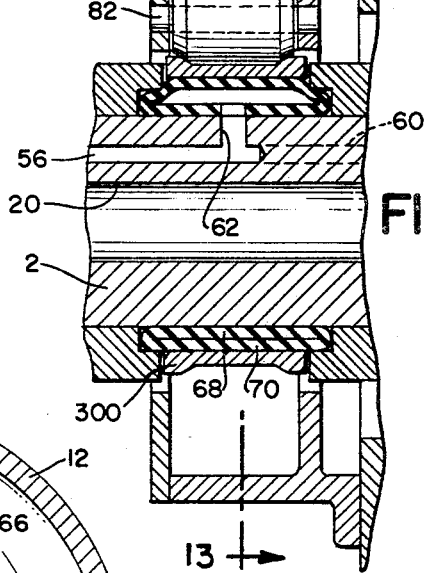
FIG. 12 is a partial section of another modified embodiment of the rotatable heat exchange apparatus of the present invention.
Figure 13:
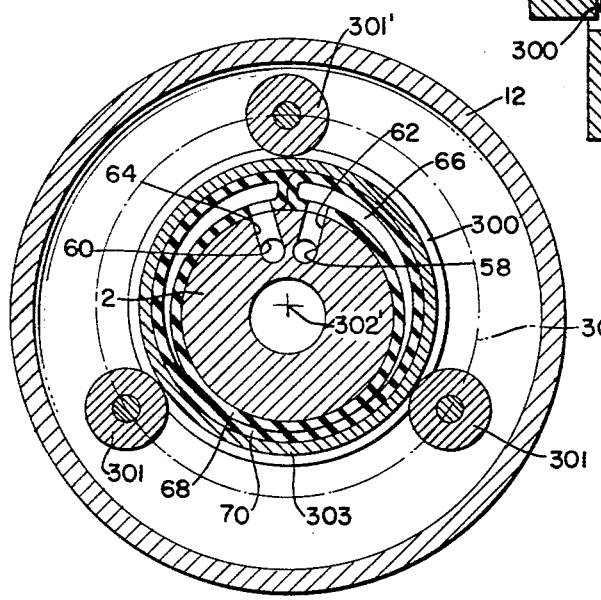
FIG. 13 is a section through 13—13 of FIG. 12.

As shown in FIGS. 12 and 13, the pressure ring designated at 300 is mounted in a floating eccentric relationship relative to the shaft 2 by a plurality of rollers 301 mounted on the housing 12 about a circle 302, having a center 302', which itself is eccentric with respect to the outer surface of the shaft 2. The eccentricity of the ring causes a collapsing of the flexible walls 68 and 70 of the duct 66 to form a constriction in the duct under the roller 301' and the remaining two rollers act as rotatable supporting guides. Any number of rollers 301 may be provided as long as the eccentricity of the ring is maintained and the point of maximum collapse of the duct 66 may be varied circumferentially of the shaft 2 by controlling the relative positioning of the rollers. For example, if the bottom two rollers as shown in FIG. 13 are positioned at equal distances from the shaft 2 and such distances are made less than the distance between the uppermost roller and the shaft, the point of maximum collapse of the duct will occur midway between these bottom rollers. In addition, the extent to which the flexible duct is constricted may also be varied by controlling the relative positioning of the rollers 301 so as to vary the degree of eccentricity of the ring 300. Suitable means, not shown, may be provided for individually adjusting the position of the rollers.

The internal diameter of the ring 300 is such that it will support the flexible duct at all points about the shaft 2. In construction, the ring is made of a dimension so that its spacing from the shaft 2 on the side 303 diametrically opposite the roller 301' is no greater than the maximum separation of the walls 68, 70 that may be safely permitted without causing a rupture of these walls as might result from the internal pressure of the fluid. Between these diametrically opposite points, the spacing of the ring from the shaft 2 will, of course, be less than the maximum spacing at point 303 and accordingly, the flexible duct 66 is completely supported over its entire length.

In the operation of this embodiment of the invention, rotation of the shaft 2 in the desired direction, induces rotation of the ring 300 therewith about the offset axis defined by the center 302' of the circle 302. The outer surface of the ring rolls within the rollers 301. These rollers are shaped as shown in FIG. 12 to hold the ring in axial alignment relative to the shaft 2. As the shaft rotates, fluid in front of the roller 301' is forced to move through the flexible duct 66 in a direction opposite the direction of rotation of the shaft; and depending on the direction of rotation of the shaft 2, the fluid is caused to flow either from bore 58 to bore 60 or vice versa.

Figure 14:
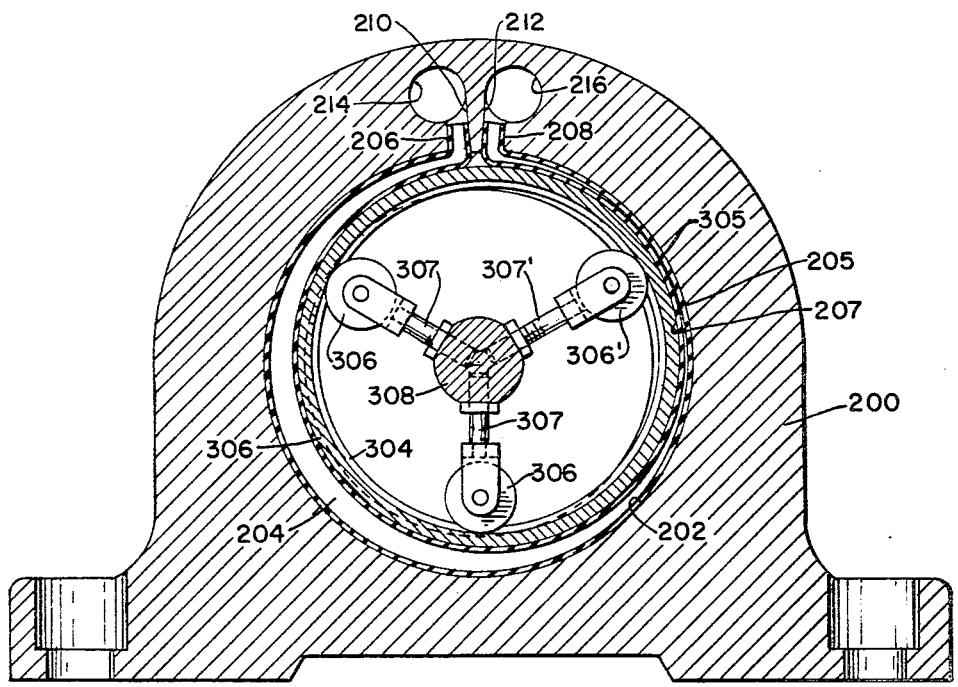
FIG. 14 is a section of another embodiment of the compressor shown in FIGS. 12 and 13.

With the embodiment of the invention just described, the eccentric ring is positioned about a rotating shaft 2 and flexible duct 66. When, however, it is desirable to secure the duct to a stationary housing as is the case with the roller arrangement shown in FIG. 8, the pressure ring member may be positioned eccentrically within the circular opening of such a housing. This construction is shown in FIG. 14 and the fundamental principle of the pumping action is the same as with all of the earlier described embodiments. As shown in FIG. 14, the housing 200 has a circular opening 202 and the flexible duct 204 is disposed upon the wall of this opening with its ends 206 and 208 inserted into taps 210 and 212, respectively. The construction of the housing and the duct is the same as that shown in FIG. 8. However, in place of the rotatable shaft 218 and concentrically positioned rollers 222 that are included in that embodiment, a single ring 304 is positioned eccentrically within the opening 202. The ring causes a collapse of the walls 205 and 207 of the duct 204 into fluid tight engagement with each other at the single point 305 to thus effect a complete constriction in said duct.

The size of the ring relative to the size of the opening 202 is such that at the point of maximum separation of the flexible walls 205 and 207 of the duct, as will occur on the side 306 of the ring diametrically opposite point 305, these walls will be supported on the one side by the opening 202 and on the other by the outer surface of the ring. Thus, the duct will be completely supported throughout its length.

For effecting movement of the point 305 along the duct to force fluid such as Freon therethrough, the ring is supported internally by a plurality of rollers 306 rotatably mounted on the ends of arms 307. The other ends of the arms are, in turn, connected to a common rotatable shaft 308 which is itself concentrically positioned in the opening 202. As will be seen from FIG. 14, the arm 307' for the roller 306' is of a length greater than that of the remaining arms so as to hold the ring eccentrically with respect to both the shaft 308 and the opening 202. Rotation of shaft 308 causes the roller 306' to move the point of collapse 305 along the length of the flexible duct and depending on the direction of rotation of the shaft 308, Freon will be pumped in either a clockwise or counter-clockwise direction through the duct.

As with the eccentric ring construction shown in FIGS. 12 and 13, the number of rollers provided in the embodiment of the invention shown in FIG. 14 may be changed as may the point of collapse of the duct relative to these rollers. One roller acts to provide the necessary pressure contact with the ring to hold it in an eccentric position and the other rollers act as rotatable supporting guides. By changing the relative lengths of the arms 307, the degree to which the duct is constructed or collapsed may be controlled to, in turn, change the pumping force exerted on the Freon contained within the duct. In addition, the roller and rotating shaft construction of FIG. 14 may be replaced by a single shaft rotated about an axis concentric with respect to the opening 202 and having an offset portion for supporting the ring. This offset portion will cause the ring to rotate eccentrically as the shaft is rotated about its axis and with such an arrangement, a suitable bearing sleeve may be provided for preventing rubbing of the ring directly against the duct.

In the above description of the present invention, a number of embodiments have been specifically described; however, it is to be understood that various changes may be made in the construction of these embodiments without departing from the scope of the invention as set out in the following claims.

I claim:

1. Heat exchange apparatus utilizing an expansible heat exchange fluid which apparatus comprises:
    (a) a rotatable shaft having a main conduit and a constriction intermediate its ends defining an orifice within said conduit;
    (b) means for rotating said shaft;
    (c) heat exchangers mounted upon each end of said rotatable shaft;
    (d) a flexible conduit mounted upon said shaft;
    (e) each said heat exchanger further having a plurality of ring-shaped heat exchange tubes defining circular heat exchange passageways disposed in planes arranged transversely to the axis of rotation of said shaft and in communication at their one end with the interior of said main conduit, and in communication at their other end with said flexible conduit for carrying the fluid in either direction therethrough while maintaining the centrifugal forces acting against the flow of fluid in either direction substantially unchanged in value; and
    (f) pressure contact means in pressure contact with said flexible conduit for forcing said heat exchange fluid in a continuous path through said flexible conduit upon rotation of said rotatable shaft then through one of said heat exchangers, through said main conduit and the orifice therein, through the other of said heat exchangers and back into said flexible conduit.

2. Heat exchange apparatus utilizing an expansible heat exchange fluid which apparatus comprises:
    (a) a rotatable shaft having a main conduit and a constriction defining an orifice within said conduit;
    (b) means for rotating said shaft;
    (c) heat exchangers mounted upon each end of said rotatable shaft;
    (d) a flexible tubular conduit having two flexible walls sealed to each other at their longitudinal edges and mounted concentrically about said shaft for rotation therewith with said shaft in supporting contact therewith throughout its length;

(e) each said heat exchanger further having heat exchange tubes;
    said heat exchange tubes being in communication at their one end with the interior of said main conduit, and in communication at their other end with said flexible conduit; and
(f) a pressure ring member positioned eccentrically about said tubular conduit in supporting contact therewith throughout its length and forming a constriction in said conduit at a point along such length to force said heat exchange fluid through said flexible conduit upon rotation of said rotatable shaft.

3. A heat exchange apparatus in accordance with claim 2 further including:
(a) a plurality of rollers mounted concentrically about said ring in rolling contact therewith for holding said ring in its eccentric portion relative to said rotatable shaft.

4. A thermodynamically reversible heat exchange apparatus utilizing an expansible heat transfer fluid which apparatus comprises:
(a) a rotatable shaft having a main conduit and a constriction intermediate its ends defining an orifice within said conduit;
(b) means for reversibly rotating said shaft;
(c) heat exchangers mounted upon each end of said rotatable shaft;
(d) a flexible conduit mounted upon the exterior of said rotatable shaft;
(e) each said heat exchanger further having heat exchange passageways through which said fluid passes arranged with respect to the axis of rotation of said shaft for carrying fluid therethrough in either direction while maintaining the centrifugal forces acting against the flow of fluid therethrough during rotation of said shaft substantially unchanged in value with a change in direction of rotation of said shaft, said heat exchange passageways being in communication at their one end with the main conduit of said rotatable shaft, and in communication at their other end with said flexible conduit; and
(f) pressure contact means in contact with said flexible conduit for forcing said heat transfer fluid through said flexible conduit upon rotation of said rotatable shaft then through one of said heat exchangers, through said main conduit and the orifice therein, through the other of said heat exchangers and back into said flexible conduit.

5. A thermodynamically reversible heat exchange apparatus utilizing an expansible heat transfer fluid which apparatus comprises:
(a) a rotatable shaft having a main conduit and a constriction defining an orifice within said shaft;
(b) means for reversibly rotating said shaft;
(c) heat exchangers mounted upon each end of said rotatable shaft;
(d) a flexible tubular conduit having two flexible walls sealed to each other at their longitudinal edges and mounted concentrically about said shaft for rotation therewith with said shaft in supporting contact therewith throughout its length;
(e) each said heat exchange further having heat exchange tubes;
    said heat exchange tubes being in communication at their one end with the main conduit of said rotatable shaft, and in communication at their other end with said flexible conduit, and
(f) a pressure ring member positioned eccentrically about said tubular conduit in supporting contact therewith throughout its length and forming a constriction in said conduit at a point along such length to force said heat exchange fluid through said flexible conduit upon rotation of said rotatable shaft.

6. A heat exchange apparatus in accordance with claim 5 further including:
(a) a plurality of rollers mounted concentrically about said ring in rolling contact therewith for holding said ring in its eccentric portion relative to said rotatable shaft.

7. A thermodynamically reversible heat exchange apparatus utilizing an expansible heat transfer fluid which apparatus comprises:
(a) a rotatable shaft having a main conduit therein, said main conduit having an intermediate constriction therein defining an orifice, and a secondary conduit therein;
(b) reversible drive means for rotating said shaft in either a clockwise or a counterclockwise direction;
(c) ducted heat exchangers mounted upon each end of said rotatable shaft;
(d) a flexible conduit forming an intermediate portion of said secondary conduit and located upon the exterior of said rotatable shaft;
(e) each said heat exchanger further having a plurality of continuous ring-shaped heat exchange tubes disposed in planes arranged transversely to the axis of rotation of said shaft and in communication at one point with the opposite ends of said main conduit, and in communication at a diametrically opposite point with the opposite ends of said secondary conduit for carrying the fluid in either direction therethrough while maintaining the centrifugal forces acting against the flow of fluid in either direction substantially unchanged in value; and
(f) a compressor having pressure contact means in pressure contact with the exterior of said flexible conduit for forcing said heat transfer fluid in a continuous path and in one direction through said flexible conduit upon rotation of said rotatable shaft in one of said directions then through one of said heat exchangers, through said main conduit and the orifice therein, through the other of said heat exchangers and back into said flexible conduit and for reversing the flow of fluid through said continuous path upon reversal of the direction of rotation of said shaft.

8. The heat exchange apparatus of claim 7 wherein:
(a) said means for rotating said shaft is an electric motor and said rotatbale shaft comprises the rotor of said motor.

9. Heat exchange apparatus in accordance with claim 8 wherein:
(a) each said heat exchanger is formed as a fan and includes heat exchange elements having air moving surfaces for moving a body of air upon rotation of said shaft, said heat exchange elements providing the sole means for moving said air.

10. A thermodynamically reversible heat exchange apparatus utilizing an expansible heat transfer fluid which apparatus comprises:
(a) a rotatable shaft having a main conduit therein, said main conduit having an intermediate constriction therein defining an orifice, and a secondary conduit therein;
(b) means for rotating said shaft in either a clockwise or a counterclockwise direction;
(c) ducted heat exchangers mounted upon each end of said rotatable shaft;
(d) a flexible conduit forming an intermediate portion of said secondary conduit and located upon the exterior surface of said rotatable shaft;
(e) each said heat exchanger further having a plurality of continuous-ring-shaped heat exchange tubes disposed in planes arranged transversely of the axis of rotation of said shaft and in communication at one point with the opposite ends of said main conduit, and in communication at a diametrically opposite point with the opposite ends of said secondary conduit for carrying the fluid in either direction therethrough while maintaining the centrifugal forces acting against the flow of fluid in either direction substantially unchanged in value;

(f) a compressor having a plurality of stationary rollers in pressure contact with the exterior of said flexible conduit for forcing said heat transfer fluid in a continuous path and in one direction through said flexible conduit upon rotation of said rotatable shaft in one direction then through one of said heat exchangers, through said main conduit and the orifice therein, through the other of said heat exchangers and back into said flexible conduit and for reversing the flow of fluid through said continuous path upon reversal of the direction of rotation of said shaft; and (g) means for varying the degree of pressure contact of said rollers upon said flexible conduit.

11. A heat exchanger fan comprising:
(a) a rotatable shaft having a main conduit therein and a secondary conduit for carrying an expansible heat exchange fluid therethrough;
(b) means for rotating said rotatable shaft;
(c) at least two hollow spokes mounted for rotation with said shaft and in communication with said main conduit and said secondary conduit respectively;
(d) a plurality of continuous ring-shaped heat exchange tubes disposed in planes arranged transversely to the axis of rotation of said shaft and in communication with the hollow interior of said spokes for rotation therewith; and
(e) a plurality of circumferentially spaced heat exchange radiating fins extending across said heat exchange tubes and having air moving surfaces for moving a body of air upon rotation of said shaft.

12. A heat exchanger fan comprising:
(a) a rotatable shaft having a main conduit therein and a secondary conduit in co-axial relationship with the main conduit for carrying an expansible heat exchange fluid therethrough;
(b) means for rotating said rotatable shaft;
(c) a plurality of radial inlet headers connected to and in communication with the interior of said main conduit;
(d) a plurality of radial return headers connected to and in communication with the interior of said secondary conduit, both of the headers being mounted on said shaft for rotation therewith;
(e) a plurality of continuous ring-shaped heat exchange tubes disposed in planes arranged transversely to the axis of rotation of said shaft and interconnecting said headers and in communication with the interiors of said headers; and
(f) a plurality of circumferentially spaced heat exchange radiating fins extending across said heat exchange tubes and having air moving surfaces for moving a body of air upon rotation of said shaft.

13. A heat exchanger fan comprising:
(a) a rotatable shaft having a main conduit therein and a secondary conduit for carrying an expansible heat exchange fluid therethrough;
(b) means for rotating said rotatable shaft; and
(c) a plurality of propeller-like ducted blades mounted for rotation with said shaft, said blades having a plurality of interconnecting channels extending radially of said shaft and forming a continuous heat exchange duct within each said blade, one end of each said continuous heat exchange duct being in communication with said main conduit and the other end being in communication with said secondary conduit.

14. Heat exchange apparatus utilizing an expansible heat exchange fluid which apparatus comprises:
(a) a rotatable shaft having a main conduit and a constriction intermediate its ends defining an orifice within said conduit;
(b) means for rotating said shaft;
(c) heat exchangers mounted upon each end of said rotatable shaft;
(d) fluid conduit means mounted on and encircling said shaft;
(e) each of said heat exchangers further having heat exchange passageways disposed in planes arranged transversely to the axis of rotation of said shaft and in communication at their one ends with the interior of said main conduit, and in communication at their other ends with said fluid conduit means for carrying the fluid in either direction therethrough while maintaining the centrifugal forces acting against the flow of fluid in either direction substantially unchanged in value; and
(f) compressor means operatively connected with said fluid conduit means for forcing said heat exchange fluid in a continuous path through said fluid conduit means upon rotation of said shaft, then through one of said heat exchangers, through said main conduit and the orifice therein, through the other of said heat exchangers and back into said fluid conduit means.

15. Apparatus for pumping fluid comprising:
(a) a flexible conduit for conveying said fluid, the effective pumping portion of said conduit describing an annular ring, said flexible conduit further comprising two flexible walls sealed to each other at their longitudinal edges;
(b) rigid cylindrically-shaped supporting means positioned in supporting contact with one of said walls throughout its width and length;
(c) protective supporting cover means positioned in supporting contact with the other of said walls throughout its width and length;
(d) pressure means in pressure contact with said protective supporting cover for holding said cover in position relative to said flexible conduit thereby collapsing at least one portion of the flexible conduit; and
(e) means for moving said pressure means and said flexible conduit relative to each other for successively collapsing said flexible conduit and forcing said fluid through said conduit.

16. Apparatus for pumping fluid in accordance with claim 15 wherein:
(a) said cylindrically-shaped supporting means comprises a rotatable shaft, the concave portion of said flexible conduit being in contact with said shaft;
(b) said protective supporting cover is flexible and positioned in contact with the convex portion of said flexible conduit; and
(c) said pressure means comprises rollers arranged concentrically with respect to said rotatable shaft in pressure contact with said protective cover for collapsing the portion of said flexible conduit beneath each said roller.

17. Apparatus for pumping fluid in accordance with claim 16 wherein said apparatus further includes:
(a) a regulator comprising:
  (1) a rotatable cam plate having diagonal slots therein for supporting the axles of said rollers;
  (2) a stationary casing having radial slots therein into which said axles extends in sliding engagement; and
  (3) means for selectively rotating said cam plate to vary the amount of fluid pumped through said flexible conduit.

18. Apparatus for pumping fluid in accordance with claim 15 wherein:
(a) said cylindrically-shaped supporting means comprises a rigid support member in contact with the convex portion of said flexible conduit;
(b) said protective supporting cover is flexible and covers the concave portion of said flexible conduit; and (c) said pressure means comprises rollers rotatably mounted on a rotatable shaft positioned in spaced concentric relationship with said flexible conduit and each in pressure contact with said protective cover for collapsing the portion of said flexible conduit beneath each of said rollers.

19. Apparatus for pumping fluid in accordance with claim 15 wherein said protective cover comprises:
  (a) a pressure ring member positioned eccentrically with respect to said cylindrical support means in supporting contact with the other wall of said conduit through its length and forming a constriction in said conduit at one point along its length.

20. Apparatus for pumping fluid in accordance with claim 19 wherein:
  (a) said cylindrically-shaped supporting means comprises a rotatable shaft supporting said conduit for rotation therewith about a predetermined axis;
  (b) said pressure ring member is positioned eccentrically about said shaft and conduit for supporting the convex portion of said conduit throughout its circumferential width and length and collapsing the walls thereof at one point along such length to define a constriction in said conduit;
  (c) said pressure means comprises rollers arranged concentrically about said ring in rolling contact therewith for holding said ring in its eccentric position relative to said shaft; and
  (d) said means for moving said rollers and flexible conduit relative to each other comprises means for rotating said shaft about said predetermined axis to move the point of collapse of the walls of said conduit along the length of the conduit.

21. Apparatus for pumping fluid in accordance with claim 19 wherein:
  (a) said cylindrically-shaped supporting means comprises a rigid support having a cylindrical opening therein for supporting the convex portion of said flexible conduit, said conduit being fixed concentrically on the wall of said opening;
  (b) said pressure ring member is positioned eccentrically within said opening in supporting relationship with the concave of said conduit throughout its circumferential width and length and forming a constriction in said conduit at one point along said length;
  (c) said pressure means comprises rollers arranged concentrically within said ring in rolling contact therewith for holding said ring in its eccentric position relative to said opening; and
  (d) said means for moving said rollers and flexible conduit relative to each other comprises means for rotating said ring member eccentrically within said opening to move said point of constriction along the length of said conduit.

22. Apparatus for pumping fluid in accordance with claim 21 wherein said means for rotating said ring member comprises:
  (a) a rotatable shaft positioned concentrically within the opening of said cylindrical support and extending axially through said ring member;
  (b) at least one arm extending radially from said rotatable shaft with one of said rollers positioned on the free end of each of said arms in rolling contact with the inner surface of said ring member for holding said ring member in its eccentric position; and
  (c) a drive for rotating said shaft concentrically within said opening to move said point of constriction along the length of said conduit.

References Cited

UNITED STATES PATENTS

| | | | |
|---|---|---|---|
| 1,845,479 | 2/1932 | Carpenter | 103—149 |
| 3,001,384 | 9/1961 | Hanson et al. | 62—499 |
| 3,025,684 | 3/1962 | McLain et al. | 62—499 |
| 3,335,670 | 8/1967 | Williams | 103—149 |
| 1,204,061 | 11/1916 | Phekenpol | 62—499 |
| 1,315,282 | 9/1919 | Carpenter | 62—499 X |
| 1,405,816 | 2/1922 | Crawford | 165—92 |
| 2,343,514 | 3/1944 | McCormack | 62—178 |
| 2,721,730 | 10/1955 | Clause et al. | 165—92 X |
| 2,805,558 | 9/1957 | Knight | 62—499 |
| 2,811,841 | 11/1957 | Grimshaw | 62—499 X |
| 2,844,945 | 7/1958 | Muffly | 62—278 |
| 2,898,864 | 8/1959 | Jupolsky | 103—149 |
| 3,101,675 | 8/1963 | Isreeli | 103—149 |

FOREIGN PATENTS

| | | |
|---|---|---|
| 437,009 | 10/1935 | Great Britain. |
| 644,944 | 2/1937 | Germany. |

ROBERT A. O'LEARY, *Primary Examiner.*

T. W. STREULE, *Assistant Examiner.*

UNITED STATES PATENT OFFICE
CERTIFICATE OF CORRECTION

Patent No. 3,397,739　　　　　　　　　　　　　　　August 20, 1968

Marvin Miller

It is certified that error appears in the above identified patent and that said Letters Patent are hereby corrected as shown below:

Column 1, line 27, "exchanger" should read -- exchange --. Column 4, line 9, "narrow" should read -- narrowed --. Column 5, line 12, "downstrem" should read -- downstream --. Column 6, line 22, "shank" should read -- shaft --. Column 14, line 63, "extends" should read -- extend --. Column 15, line 12, "through" should read -- throughout --.

Signed and sealed this 13th day of January 1970.

(SEAL)
Attest:

Edward M. Fletcher, Jr.　　　　　　　　　　　WILLIAM E. SCHUYLER, JR.
Attesting Officer　　　　　　　　　　　　　　　Commissioner of Patents